(12) United States Patent
Thiel

(10) Patent No.: US 9,371,016 B2
(45) Date of Patent: Jun. 21, 2016

(54) FITTING FOR A VEHICLE SEAT, AND VEHICLE SEAT

(71) Applicant: Johnson Controls Components GmbH & Co. KG, Kaiserslautern (DE)

(72) Inventor: Peter Thiel, Remscheid (DE)

(73) Assignee: Johnson Controls Components GmbH & Co. KG, Kaiserslautem (DE)

( * ) Notice: Subject to any disclaimer, the term of this patent is extended or adjusted under 35 U.S.C. 154(b) by 19 days.

(21) Appl. No.: 14/375,628

(22) PCT Filed: Jun. 21, 2013

(86) PCT No.: PCT/EP2013/062958
§ 371 (c)(1),
(2) Date: Jul. 30, 2014

(87) PCT Pub. No.: WO2014/001207
PCT Pub. Date: Jan. 3, 2014

(65) Prior Publication Data
US 2014/0361594 A1 Dec. 11, 2014

(30) Foreign Application Priority Data

Jun. 26, 2012 (DE) .......................... 10 2012 012 852
Feb. 14, 2013 (DE) .......................... 10 2013 002 819

(51) Int. Cl.
*B60N 2/20* (2006.01)
*B60N 2/235* (2006.01)

(52) U.S. Cl.
CPC *B60N 2/235* (2013.01); *B60N 2/20* (2013.01); *B60N 2/2352* (2013.01)

(58) Field of Classification Search
CPC ....................................... B60N 2/2356

USPC ............................................... 297/362, 367 R
See application file for complete search history.

(56) References Cited

U.S. PATENT DOCUMENTS

| 5,733,008 A * | 3/1998 | Tame ..................... B60N 2/433 297/216.1 |
| 6,659,557 B2 * | 12/2003 | Deptolla ............. B60N 2/2354 297/367 R |
| 6,799,806 B2 | 10/2004 | Eppert et al. |
| 7,380,885 B2 * | 6/2008 | Fischer .................... B60N 2/20 297/362 |
| 7,503,099 B2 * | 3/2009 | Pejathaya ................ B60N 2/20 16/324 |
| 7,571,962 B2 | 8/2009 | Thiel et al. |

(Continued)

FOREIGN PATENT DOCUMENTS

| DE | 44 36 101 A1 | 6/1995 |
| DE | 195 48 809 C1 | 5/1997 |

(Continued)

*Primary Examiner* — Timothy J Brindley
(74) *Attorney, Agent, or Firm* — McGlew and Tuttle, P.C.

(57) ABSTRACT

A fitting (10) for a vehicle seat has a first fitting part (11) and a second fitting part (12) that are rotatable relative to one another and are in geared connection, and a third fitting part (74) mounted on the first fitting part (11) such that it can be pivoted relative to the first fitting part (11). The third fitting part (74) can be locked to the first fitting part (11) by a pawl (80) which is mounted at a first articulation point (D1) on the third fitting part (74). The third fitting part (74), which has a locking cam (90), which is mounted at a second articulation point (D2), a coupler (98), which is connected at a third articulation point (D3) to the locking cam (90) and at a fourth articulation point (D4) to the pawl (80), and the pawl (80) define a four-bar linkage (74, 80, 98, 90).

16 Claims, 7 Drawing Sheets

(56) References Cited

U.S. PATENT DOCUMENTS

| | | | | |
|---|---|---|---|---|
| 7,690,728 | B2* | 4/2010 | Miyauchi | B60N 2/20 297/362 |
| 9,114,736 | B2* | 8/2015 | Ngiau | B60N 2/12 |
| 2003/0127898 | A1* | 7/2003 | Niimi | B60N 2/206 297/367 R |
| 2008/0315656 | A1 | 12/2008 | Becker et al. | |
| 2010/0026069 | A1* | 2/2010 | Bruck | B60N 2/20 297/344.1 |
| 2010/0096897 | A1* | 4/2010 | Kienke | B60N 2/2352 297/367 R |
| 2010/0171351 | A1* | 7/2010 | Thiel | B60N 2/2252 297/341 |
| 2010/0283304 | A1* | 11/2010 | Thiel | B60N 2/206 297/367 R |
| 2011/0068612 | A1* | 3/2011 | Thiel | B60N 2/123 297/344.1 |
| 2011/0221249 | A1* | 9/2011 | Flesch | B60N 2/0232 297/362 |
| 2012/0248841 | A1* | 10/2012 | Hellrung | B60N 2/22 297/354.1 |
| 2013/0207432 | A1* | 8/2013 | Hiemstra | B60N 2/2252 297/362 |
| 2014/0138998 | A1* | 5/2014 | Christoffel | B60N 2/2354 297/367 R |

FOREIGN PATENT DOCUMENTS

| | | |
|---|---|---|
| DE | 102 46 473 A1 | 4/2004 |
| DE | 10 2005 003 818 A1 | 8/2006 |
| DE | 10 2006 003243 A1 | 8/2007 |
| DE | 10 2008 017 019 A1 | 12/2008 |
| JP | S63-183013 A | 7/1988 |

* cited by examiner

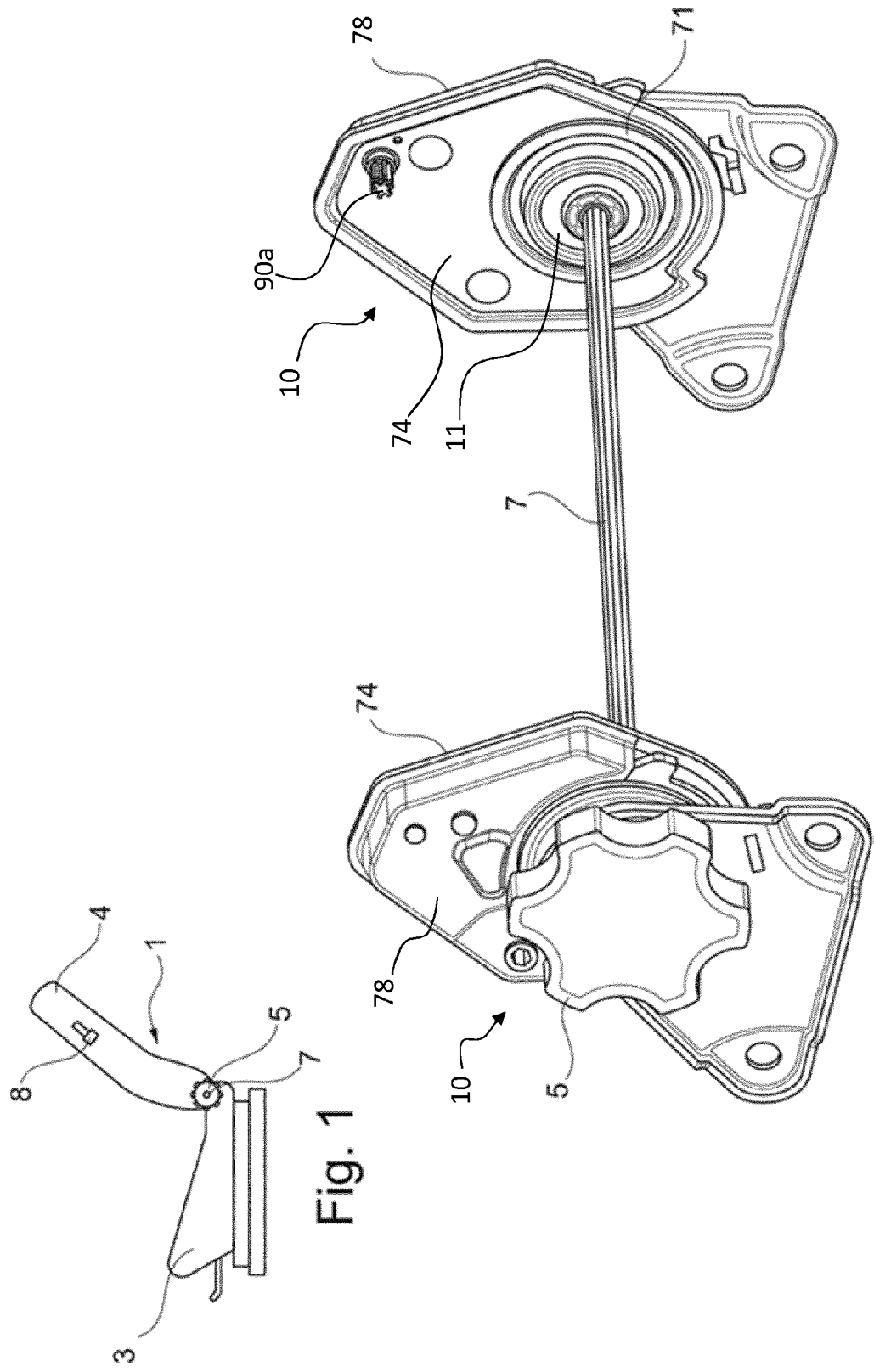

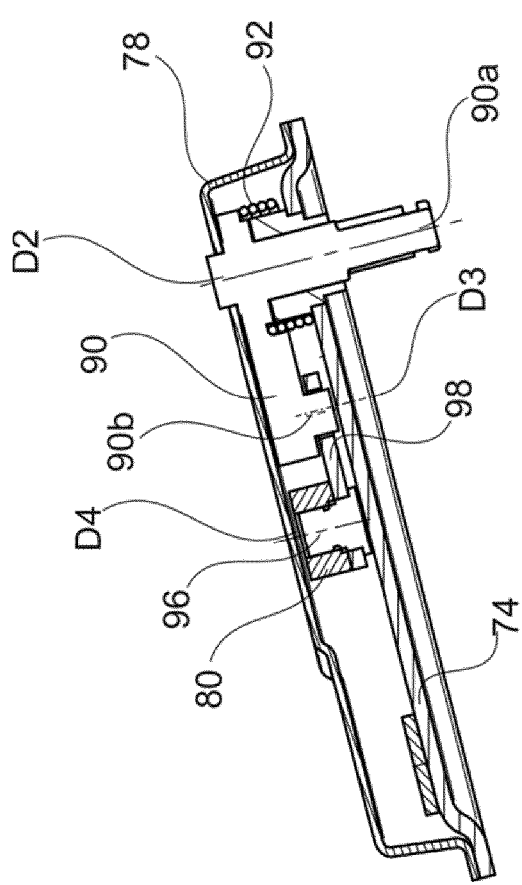
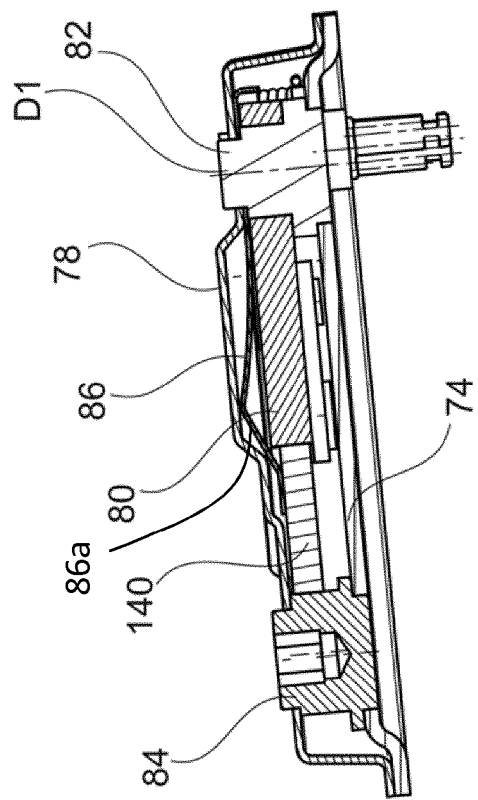

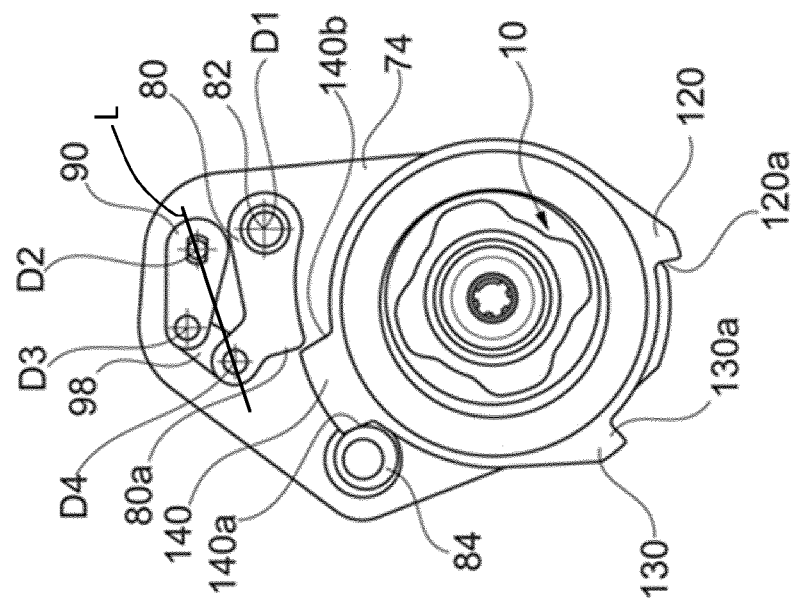
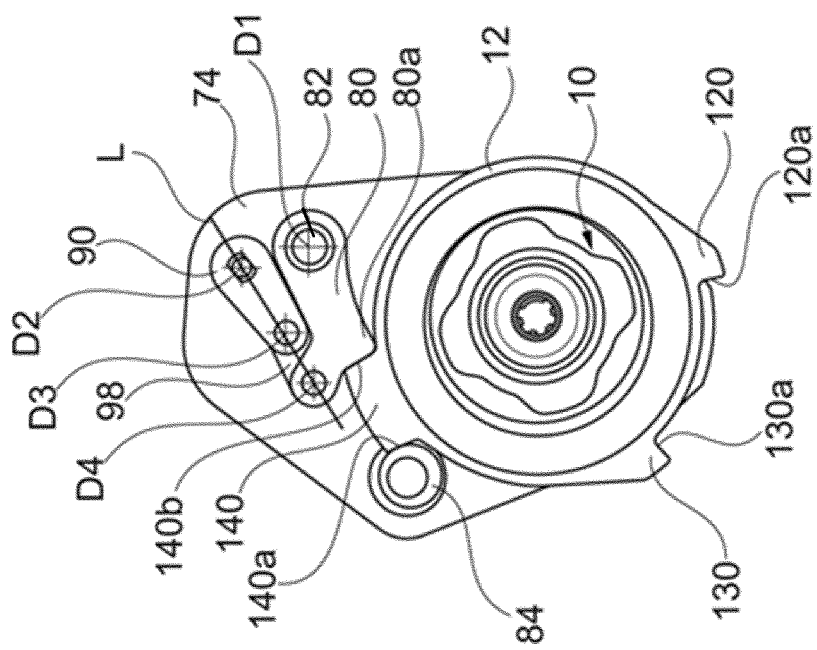

FITTING FOR A VEHICLE SEAT, AND VEHICLE SEAT

CROSS REFERENCE TO RELATED APPLICATIONS

This application is a U.S. National Phase Application of International Application PCT/EP2013/062958 filed Jun. 21, 2013 and claims the benefit of priority under 35 U.S.C. §119 of German Patent Application DE 10 2012 012 852.5 filed Jun. 26, 2012 and German Patent Application DE 10 2013 002 819.1 filed Feb. 14, 2013, the entire contents of which are incorporated herein by reference.

FIELD OF THE INVENTION

The invention relates to a fitting for a vehicle seat, the fitting having a first fitting part and a second fitting part, which are rotatable relative to one another and are in geared connection with one another, and having a third fitting part which is mounted on the first fitting part so as to be pivotable relative to the first fitting part, wherein the third fitting part is lockable to the first fitting part by means of a pawl mounted in a first hinge point on the third fitting part. The invention further relates to a vehicle seat having such a fitting.

BACKGROUND OF THE INVENTION

A fitting of this type is known from U.S. Pat. No. 7,571,962 B2. The first fitting part and the second fitting part are in geared connection with one another in order to adjust the inclination of the back rest. The third fitting part is pivotably mounted on a bearing ring which is fastened on the first fitting part. In addition, a separately realized latching element sits on the bearing ring and is fastened thereto such that it is fixedly connected to the first fitting part. A toothed pawl which is pivotably mounted on the third fitting part locks to the latching element which is also toothed in a radially protruding region for this purpose. If the pawl is opened, the back rest is freely pivotable. The free pivoting serves in particular to facilitate access of passengers to a rear row of seats.

A similar fitting is known from DE 10 2008 017 019 A1. The first fitting part and the second fitting part are in geared connection with one another in order to adjust the inclination of the back rest. An encircling ring engages over the second fitting part and is fixedly connected to the first fitting part, together forming a nose which provides a region protruding radially from the otherwise circular basic form. A third fitting part is pivotably mounted relative to the first fitting part. A bolt-shaped stop which is provided on the third fitting part and a prestressed lock which is pivotably mounted on the third fitting part receive the nose between them and thus lock the third fitting part to the first fitting part. If the lock is opened, the back rest is freely pivotable.

SUMMARY OF THE INVENTION

The object underlying the invention is to improve a fitting of the type named in the introduction, in particular to make available a weight-optimized and space-optimized locking unit for the free pivoting of the back rest and to make available a vehicle seat having such a fitting.

According to the invention, a fitting for a passenger vehicle seat is provided. The fitting comprises a first fitting part, a second fitting part, the first fitting part and the second fitting part being rotatable relative to one another and are in geared connection with one another and a third fitting part mounted on the first fitting part so as to be pivotable relative to the first fitting part. A pawl is mounted in a first hinge point on the third fitting part, wherein the third fitting part is lockable to the first fitting part the pawl. A locking cam is mounted in a second hinge point on the third fitting part. A coupler is pivotably connected to the locking cam in a third hinge point and to the pawl in a fourth hinge point. The third fitting part, the locking cam, the coupler and the pawl define a four-bar linkage.

According to another aspect of the invention, a passenger vehicle seat is provided comprising a seat part, a back rest and a fitting according to the invention. The seat part is connected to the second fitting part and the back rest is connected to the third fitting part.

As a result of a locking cam which is mounted in a second hinge point on the third fitting part, a coupler which is pivotably connected to the locking cam in a third hinge point and to the pawl in a fourth hinge point and the pawl defining a four-bar chain (four-bar linkage), the pawl can be locked in the region of a dead center position in which forces acting in an opening manner on the pawl, in particular crash forces, are able to be supported in a particularly simple but effective manner. The term dead center position, in this case, is to be understood as an elongated position of the coupler and of the locking cam where the second hinge point, the third hinge point and the fourth hinge point are arranged along an imaginary, straight line. Forces along said line do not allow the coupler and the locking pawl to buckle.

The term four-bar linkage is to be understood as four gear members which are connected together by means of hinge points. The hinge points can be formed by turning joints, sliding joints or by a turning and sliding joint, that is a combination of a turning joint and a sliding joint. A turning and sliding joint is to be viewed as a separate hinge point although the turning and sliding joint enables movements which deviate from a pure rotational movement. The four-bar linkage of a fitting according to the invention can consequently have a degree of gearing freedom of one or greater than one.

In a preferred manner, one of the hinge points of the four-bar linkage is realized as a turning and sliding joint and the remaining hinge points as pure turning joints. As a result, the pawl is able to be locked beyond the dead center position. It is particularly effective when the second hinge point is realized as a turning and sliding joint and the remaining hinge points are realized as turning joints.

A play in the four-bar linkage, which is inevitably present as a result of the turning and sliding joint, has no negative effects on the zero backlash of the locking in the normal operation of the seat if a spring prestresses the four-bar linkage, in particular the locking cam, in the direction of the locked position of the pawl and pivots the locking cam in abutment against the pawl. A locking cam of the pawl, which is designed as a clamping face outside the self-locking, is clamped, as a result, against the locking face of the first fitting part without the turning and sliding joint having to be set in a play-free manner as a result of a maximum deflection in the translation direction.

The dead center position can be generated in a particularly simple manner by, in the locked state of the pawl, the third hinge point lying along on an imaginary connecting line between the second hinge point and the fourth hinge point or the third hinge point lying between the connecting line and the pawl. During the unlocking operation of the pawl, the third hinge point is moved to the side of the connecting line remote from the pawl by means of the four-bar linkage such that the dead center position is lifted.

The fitting is preferably unlocked by the locking cam being pivoted against the force of the spring for unlocking the pawl and at the same time the four-bar linkage moves the pawl in the direction of its unlocked position. To this end, the locking cam includes a bearing journal which is rotatably mounted in an opening of the third fitting part thereby forming the second hinge point. In a preferred manner, the bearing journal comprises a profiled interface, in particular a polygonal form, for the at least indirect connection to a hand lever on the back rest of the vehicle seat.

The invention is explained in more detail below by way of an advantageous exemplary embodiment shown in the drawings. However, the invention is not limited to said exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic representation of a vehicle seat;

FIG. 2 is a perspective representation of part of the vehicle seat;

FIG. 7 is a section through the fitting along the line VII-VII in FIG. 5;

FIG. 8 is a section through the fitting along the line VIII-VIII in FIG. 5;

FIG. 9 is a top view onto the fitting in the locked state of the free pivoting device without a cover and without a retaining spring;

FIG. 10 is a view corresponding to FIG. 9 during the unlocking of the free pivoting device;

DESCRIPTION OF THE PREFERRED EMBODIMENTS

Figure 3:
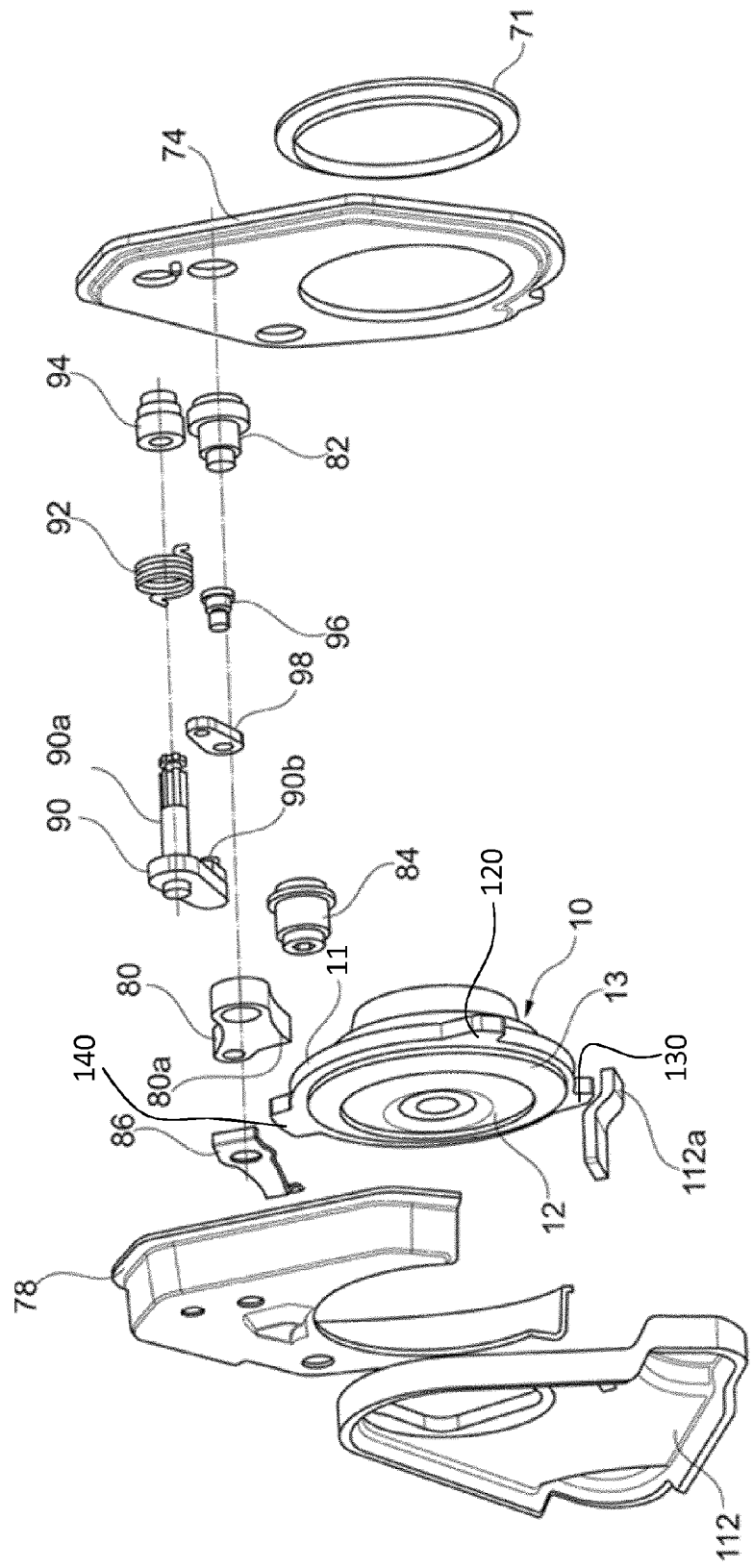
FIG. 3 is an exploded representation of the fitting including the adapter.

Referring to the drawings in particular, as vehicle seat 1 for a passenger vehicle comprises a seat part 3 and a back rest 4 which is adjustable in its inclination relative to the seat part 3. For adjusting the inclination of the back rest 4, a drive shaft 7, which is arranged horizontally in the transition region between the seat part 3 and the back rest 4, is rotated in a manual manner, for example, by means of a hand wheel 5, or in a motor-driven manner, for example, by means of an electric motor. The drive shaft 7 engages non-rotatably in a fitting 10 on each of the two sides of the vehicle seat 1. The drive shaft 7 defines the directional specifications of a cylindrical coordinate system used below.

The fitting 10 comprises a first fitting part 11 and a second fitting part 12 which are rotatable relative to one another. Each of the two fitting parts 11 and 12 can be approximately inscribed in a circular disk form. Individual functional geometries described again below project in the radial direction over the circular basic geometry of the first fitting part 11. An encircling ring 13 is provided for receiving the axially acting forces, that is for the cohesive strength of the fitting parts 11 and 12. Such cohesive strength by means of an encircling ring is described, for example, in U.S. Pat. No. 6,799,806 A. The preferably metal encircling ring 13 is connected fixedly to one of the two fitting parts 11 and 12, in the present case, for example, welded or flanged (in the circumferential direction at least in part) to the first fitting part 11 in an outer edge portion. By means of a radially inwardly pointing edge, the encircling ring 13 engages radially on the outside over the other of the two fitting parts 11 and 12 which is movable relative to it, where applicable with the interposition of a separate sliding ring, without preventing the relative rotation of the two fitting parts 11 and 12, i.e. the encircling ring 13 and the fitting part 11 or 12 which is fixedly connected thereto encircle the other of the two fitting parts 11 and 12 which is movable relative to them. Structurally, the two fitting parts 11 and 12 consequently together (with the encircling ring 13) form a disk-shaped unit.

After fastening the fitting 10 on the vehicle seat 1, the first fitting part 11 is in (locked) connection with the back rest 4 as long as a free pivoting locking described below is not unlocked. The second fitting part 12 is connected fixedly by means of an adaptor 112 to the structure of the seat part 3, that is it is solid with the seat part. However, it is also possible to exchange the assignments of the fitting parts 11 and 12, i.e. the first fitting part 11 would then be solid with the seat part and the second fitting part 12 would be connected to the back rest 4. The fitting 10 lies in the force flux between the back rest 4 and the seat part 3, which is why the two fitting parts 11 and 12 consist of metal, preferably of steel.

The fitting 10 includes a gear fitting where the first fitting part 11 and the second fitting part 12 are connected together by means of a gear unit for adjusting and securing, more precisely by means of a—in the present case self-locking—eccentric path gear unit, as is described, for example, in DE 44 36 101 A1.

To realize the gear unit, an external gear wheel 16 is realized on the second fitting part 12 and an internal gear ring 17 is realized on the first fitting part 11 and they mesh together. The diameter of the tip circle of the external gearing of the gear wheel 16 is smaller by at least one tooth height than the diameter of the root circle of the internal gearing of the gear ring 17. A corresponding difference in the number of teeth of the gear wheel 16 and the gear ring 17 of at least one tooth enables the gear ring 17 to move in a rolling manner on the gear wheel 16. As a result of said rolling movement, the first fitting part 11 and the second fitting part 12 are rotated relative to one another and, as a result, the inclination of the back rest 4 is modified relative to the seat part 3. The passenger of the vehicle seat 1 can consequently adapt the inclination of the back rest to his individual comfort requirements.

The comfort adjustment range of the back rest is defined by a stop 112a, which is fixedly connected to the adapter 112 which is solid with the seat part, engaging between a first cam 120 and a second cam 130 of the first fitting part 11. The first cam 120 and the second cam protrude above the circular basic geometry of the first fitting part 11 in the radial direction as functional geometries. A first stop face 120a which faces the stop 112a is realized on the first cam 120 and a second stop face 130a which faces the stop 112a is realized on the second cam 130, of which one in each case abuts against the stop 112a in one of the two end points of the comfort adjustment range of the back rest and prevents further adjustment of the fitting 10. The spacing between the first stop face 120a and the second stop face 130a is greater than the dimension of the stop 112a lying between the stop faces 120a, 130a, as a result of which the comfort adjustment range of the back rest is defined.

The realizing of the gear wheel 16 and the gear ring 17 is effected preferably by means of one single embossing-stamping operation which at the same time stamps the fitting parts 11, 12 from their starting material. As an alternative to this, the fitting parts 11, 12—with similar geometries and similar functions—can be produced by massive forming (for example cold extrusion or hot extrusion). In the present case, the gear wheel 16 forms the radially outer edge of the second fitting part 12, i.e. the second fitting part 12 closes off radially on the outside with the gear wheel 16.

The second fitting part 12 comprises a collar 19 concentrically to the gear wheel 16. The collar 19 can be integrally formed (i.e. realized in one piece) as a collared groove on the said fitting part or can be fastened thereon as a separate sleeve. A driver 21 is rotatably mounted in the collar 19 by means of a hub 22. The driver 21 preferably consists of plastics material. The hub 22 of the driver 21 is provided centrally with a bore 23 for receiving the drive shaft 7. The profile of the bore 23 is realized so as to match the profile of the drive shaft 7, in the present case a spline. Connecting to its hub 22, the driver 21 comprises a cover disk 25 which is realized integrally with the hub 22 and has a larger diameter than the hub 22.

Two wedge segments 27, which—by way of their curved outside faces—bear the first fitting part 11, are supported—by way of their curved inside faces—on the collar 19. For this purpose, a receiving means of the last-mentioned fitting part is equipped with a preferably non-rotatably pressed-in plain bearing bush 28, against which the outside faces of the wedge segments 27 abut. The terms "support" and "bear" are not to be restricted by the fitting 10 to a certain direction of the force flux as said direction depends on the assembly of the fitting 10.

The driver 21 comprises—at a radial spacing to the hub 22—a driver segment 29 which bites with play between the narrow sides of the wedge segments 27 and is realized integrally with the cover disk 25 and with the hub 22. The wedge segments 27, the wide sides of which face one another, for example each with an opening or a recess defined by projecting material parts, receive in each case an angled end finger 35a of an omega-shaped spring 35. The spring 35 acts on the wedge segments 27 in the circumferential direction, in particular in order to press them apart, the wide sides of the wedge segments 27 being able to contact one another and act on one another in operation.

The driver 21 is axially secured on the outside surface of the fitting part which comprises the collar 19 by a retaining ring 43 which is preferably clipped on. The retaining ring 43 extends in the axial direction along part of the hub 22 such that the hub 22 does not abut directly against the inside surface of the collar 19, but, with the retaining ring 43 interposed, is mounted in the collar 19 (and as a result the driver 21 is mounted on the second fitting part 12). On the outside surface of the fitting part which comprises the plain bearing bush 28 (in the present case the first fitting part 11), between its radially outer edge and the cover disk 25, there is provided a sealing ring 44, for example of rubber or soft plastics material, which is connected, in particular clipped, to the cover disk 25.

An eccentric, which in the extension of the direction of eccentricity presses the gear wheel 16 at an engagement point into the gear ring 17, is defined by the wedge segments 27 (and the spring 35). In the case of a drive by means of the (repeatedly) rotating drive shaft 7, a torque is initially transmitted to the driver 21 and by means of the driver segment 29 is then transmitted to the eccentric which slides along the plan bearing bush 28, thereby displacing the direction of eccentricity and consequently displacing the engagement point of the gear wheel 16 in the gear ring 17, which is represented as a wobbling rolling movement, i.e. as a relative rotation with superimposed wobbling. As a result, the inclination of the back rest 4 is steplessly adjustable between several positions of use.

To improve the dynamic operating performance, a retaining spring 51 is preferably provided as another blocking element, such as, for example, is disclosed in DE 195 48 809 C1. The retaining spring 51 interacts in the present case with a toothing 55 which is realized as a further gear ring on the first fitting part 11. The retaining spring 51 blocks each of the wedge segments 27 in the non-driven state (by the retaining spring 51 blocking the spring 35 by abutting against the end finger 35a) and is released by the driven driver 21.

Apart from the said disk-shaped unit realized as a gear fitting with the components contained therein, each fitting 10 also includes a free pivoting device. A third fitting part 74 is mounted on the first fitting part 11, on the side thereof remote from the second fitting part 12, by means of a bearing ring 71 which is fastened on the first fitting part 11. The substantially plate-shaped third fitting part 74 is connected to the back rest structure of the back rest 4 and, for the centrally effected free pivoting relative to the first fitting part 11, is pivotable about a central axis A (which is defined by the bearing ring 71) which lies parallel to the transmission rod 7. Insofar as nothing to the contrary is described, all the rotations described below are carried out about axes of rotation which are aligned parallel to the axis A.

When the vehicle seat 1 is being used, the third fitting part 74 is locked to the first fitting part 11. To this end, the fitting part 11 comprises as further operational geometry a projection 140 which projects in the radial direction over the circular basic geometry of the first fitting part 11 and interacts with a pawl 80 which is rotatably mounted by means of a bearing bolt 82 on the side of the third fitting part 74 which faces the first fitting part 11.

The pawl 80 has a basic geometry similar to an L-shape with a long portion and a short portion. A circular hole in the end region of the long portion which is remote from the short portion serves for receiving the bearing bolt 82 and together with said bearing bolt forms the bearing point of the pawl 80 in a first hinge point D1 on the third fitting part 74. In the connecting region between the long portion and the short portion of the pawl 80, a locking cam 80a is formed for interacting with a locking face 140b of the projection 140. In order to lock the third fitting part 74 to the first fitting part 11, the locking cam 80a is supported in the free pivoting direction on the locking face 140b of the projection 140.

An eccentric bolt 84 which serves as a stop on the third fitting part 74 serves for defining the pivoting movement of the third fitting part 74 in the rear pivoting direction of the back rest 2 (anticlockwise in FIGS. 5, 9, 10, 11 and 12) by the eccentric bolt 84 running against a supporting face 140a of the projection 140 when the position of use of the back rest 4 is reached again once the free pivoting has been completed. To compensate for production tolerances, the eccentric bolt 84 is stepped in its axial direction with extensively cylindrical steps which are eccentric to one another. A cylindrical portion of the eccentric bolt 84 which is inserted into a circular hole of the third fitting part 74 is offset radially by an eccentricity in the radial direction to a further cylindrical portion of the eccentric bolt 84, the last-mentioned cylindrical portion coming to rest on the supporting face 140a when the position of use is reached again. When the eccentric bolt 84 is rotated about the cylindrical portion inserted into the third fitting part 74, the cylindrical portion which can be moved to rest on the supporting face 140a is moved as a result along a circular path, the radius of which corresponds to the eccentricity. During the assembly of the fitting, the eccentric bolt 84 is rotated by an amount in relation to the third fitting part 74 until the nominal position of the third fitting part 74 relative to the first fitting part 11 is set; the eccentric bolt 84 is then fixed on the third fitting part 74, in particular is welded to said third fitting part.

To compensate for production tolerances, the bearing bolt 82 can also be constructed in a correspondingly eccentrically stepped manner. A cylindrical portion of the bearing bolt 82 which is inserted into a circular hole of the third fitting part 74 then has a center axis which is radially offset to a parallel center axis, which defines the first hinge point D1, of a cylindrical portion 82 serving for the bearing arrangement of the pawl 80. The eccentricity of the bearing bolt 82 is defined as a result. When the eccentric bolt 82 is rotated about the cylindrical portion inserted into the third fitting part 74, the first hinge point D1 is moved along a circular path, the radius of which corresponds to the eccentricity. During the assembly of the fitting, the bearing bolt 82 is rotated by an amount in relation to the third fitting part 74 until the first hinge point D1 has reached its optimum position and the pawl 80, by means of maximum engagement of the locking cam 80a, engages in a play-free manner with the locking face 140b of the projection 140, however outside the angular range of the self-locking; the bearing bolt is then fixed on the third fitting part 74, in particular is welded to said third fitting part.

A locking cam 90 is mounted so as to be rotatable on the third fitting part 74 in a second hinge point D2, which is at a spacing from the first hinge point D1, on the side that faces the first fitting part 11. To this end, the locking cam 90 comprises at one end a bearing journal 90a which projects perpendicularly from the locking cam 90, extends parallel to the axis A and is inserted by means of a bush 94 into an opening of the third fitting part 74. The free end of the bearing journal 90a projects through the third fitting part 74 and protrudes on the side remote from the pawl 80 over the substantially plate-shaped basic geometry of the third fitting part 74. The free end of the bearing journal 90a is realized in a profiled manner, in particular is realized in the manner of a polygon. A component realized with a corresponding counter profile can be slipped on in the axial direction such that a fixed-in-position connection between the bearing journal 90a and the slipped-on component is provided. The slipped-on component in the present case is a lever, not shown in the Figures, which is in operative connection by means of a cable pull with a hand lever 8 which is fastened in the upper region of the back rest 4. Actuation of the hand lever 8 rotates the bearing journal 90a and consequently the locking cam about the second hinge point D2.

A coupler 98 with an even, elongated basic form is connected by way of a first end in a third hinge point D3 to the end of the locking cam 90 which is remote from the bearing journal 90a. The second end of the coupler 98 is connected to the short portion of the pawl 80 in a fourth hinge point D4.

The third hinge point D3 is formed by a cylindrical journal 90b which protrudes parallel to the axis A at the end of the locking cam 90 remote from the bearing journal 90a and engages in an elongated hole of the first end of the coupler 98. As a result of the pairing between the cylindrical journal 90b and the elongated hole of the coupler 98, the third hinge point D3 is realized as a turning and sliding joint and thus, as well as a pure rotational movement, also enables a translation which is defined by the elongated hole geometry between the coupler 98 and the locking cam 90.

The fourth hinge point D4 is formed by a rivet 96 which is inserted through a circular hole of the second end of the coupler 98 and a circular hole in the end region of the short portion of the pawl 80 and is riveted in such a manner that a pure turning joint is created.

The pawl 80 which is mounted in the first hinge point D1 on the third fitting part 74, the locking cam 90 which is mounted in the second hinge point D2 on the third fitting part 74 and the coupler 98 which is pivotally connected to the locking cam 90 in the third hinge point D3 and to the pawl 80 in the fourth hinge point D4 define an extensively even four-bar linkage (pivotably mounted on the third fitting part 74) which serves for unlocking and locking the free pivoting function.

A cover 78 which is fastened on the third fitting part 74 covers the aforementioned individual parts of the free pivoting device—at least in part—and protects them against contamination. The bearing bolt 82, the locking cam 90 and the eccentric bolt 84 are supported or mounted in an opposed hole pattern in the cover 78 in addition to their bearing arrangement in the holes of the third fitting part 74.

FIGS. 9 to 12 show the unlocking and locking of the free pivoting function. FIG. 9 shows the locked state of the position of use. The pawl 80 is locked, i.e. the locking cam 80a is supported on the locking face 140b. A spring 92, which is effective between the locking cam 90 and the third fitting part 74, acts on the locking cam 90 with a torque in the direction of abutment against the pawl 80 (anticlockwise in FIG. 9). The pawl 80, as a result, is held in its locked position under normal working loads. The third hinge point D3 lies on an imaginary connecting line L between the second hinge point D2 and the fourth hinge point D4 or (depending on the tolerance position) slightly between the connecting line L and the pawl 80. The locking cam 90 and the coupler 98, as a result, are aligned almost in a line. The cam 90 is supported laterally on the pawl 80 such that the third hinge point D3 is not able to move further in the direction of the pawl 80. As a result, the four-bar linkage is situated in a blocked (dead center) position; even high crash forces acting on the pawl 80 cannot open the pawl 80 on account of the elongated position of the locking cam 90 and the coupler 98 and the supporting of the cam 90 on the pawl 80. Where the third hinge point D3 is designed as a turning and sliding joint, in the event of a crash the small, defined translation path is moved through in the joint until the bearing journal 90a abuts against an edge of the elongated hole of the coupler 98.

FIG. 10 shows the fitting 10 during the unlocking of the free pivoting function. By actuating the hand lever 8, the locking cam 90 (clockwise in FIG. 10) is pivoted away from the pawl 80 in opposition to the force of the spring 92. The third hinge point D3 is moved onto the side of the connecting line L remote from the pawl 80. By means of the coupler 98, the locking cam 90 pulls the pawl 80 out of the locked position such that the locking cam 80a of the pawl 80 no longer abuts against the locking face 140b and the third fitting part 74 including the back rest 4 is movable in the free pivoting direction. The back rest 4 is able to be freely pivoted. If the third hinge point D3—as described beforehand—lies between the connecting line L and the pawl 80 in the locked state of the free pivoting device, the design of the third hinge point D3 as a turning and sliding joint enables it to exceed the elongated position, that is the connecting line L during the unlocking operation. In a modified design, one of the other hinge points D1, D2, D4 is realized as a turning and sliding joint instead of the third hinge point D3. The remaining hinge points D1, D2, D3, D4 are realized as pure turning joints.

Figure 11:
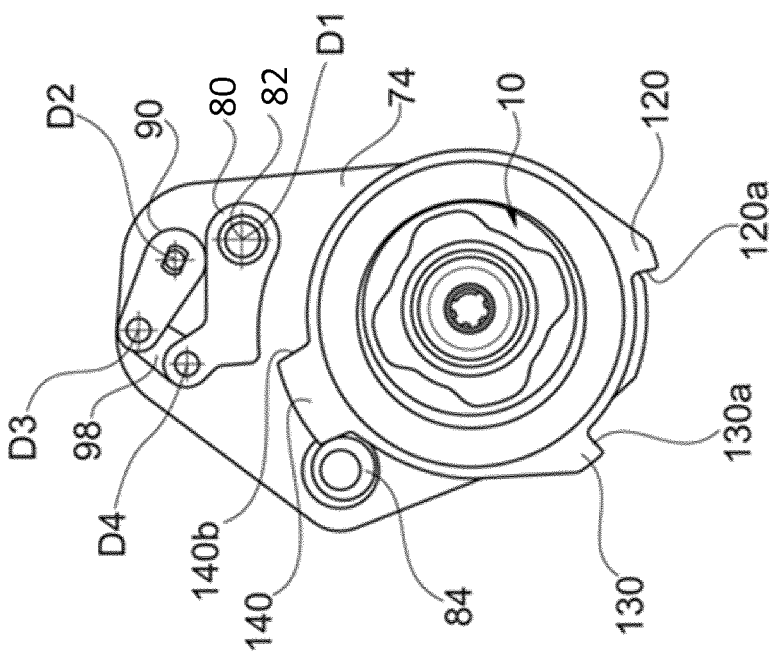
FIG. 11 is a view corresponding to FIG. 9 of the totally unlocked free pivoting device.

In order to enable secure unlocking of the free pivoting function under all tolerance conditions, the pawl 80—as can be seen in FIG. 11—is able to be pivoted a little further into the opening direction.

Figure 12:
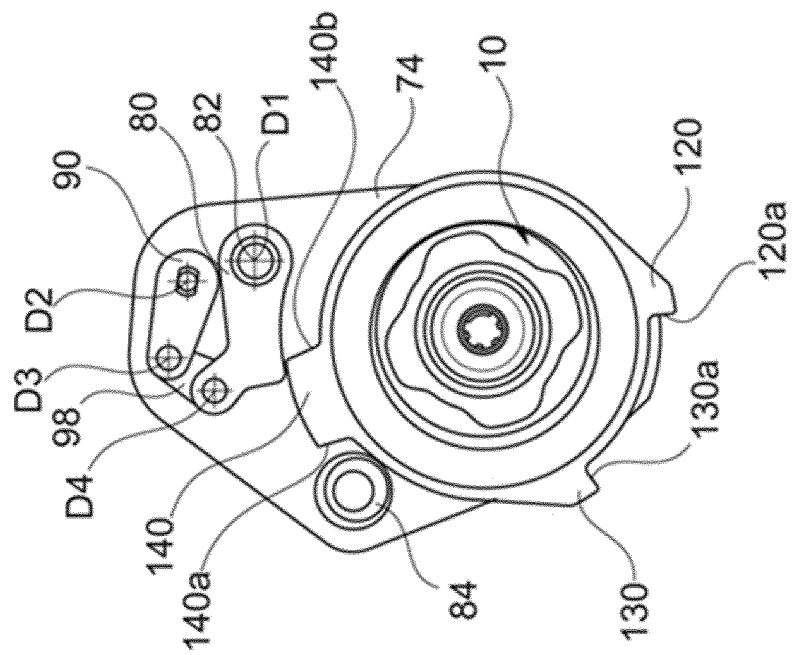
FIG. 12 is a view corresponding to FIG. 9 of the unlocked free pivoting device during the free pivoting of the back rest.

During the free pivoting operation shown in FIG. 12, the locking cam 80a of the pawl 80 rests on the radially outer boundary of the projection 140 and slides along the same. The hand lever 8 can consequently remain non-actuated even after a small free pivoting angle without the pawl 80 being able to be locked again.

The pivoting back and locking of the third fitting part 74 and consequently of the back rest 4 is effected in the reverse order.

Figure 5:
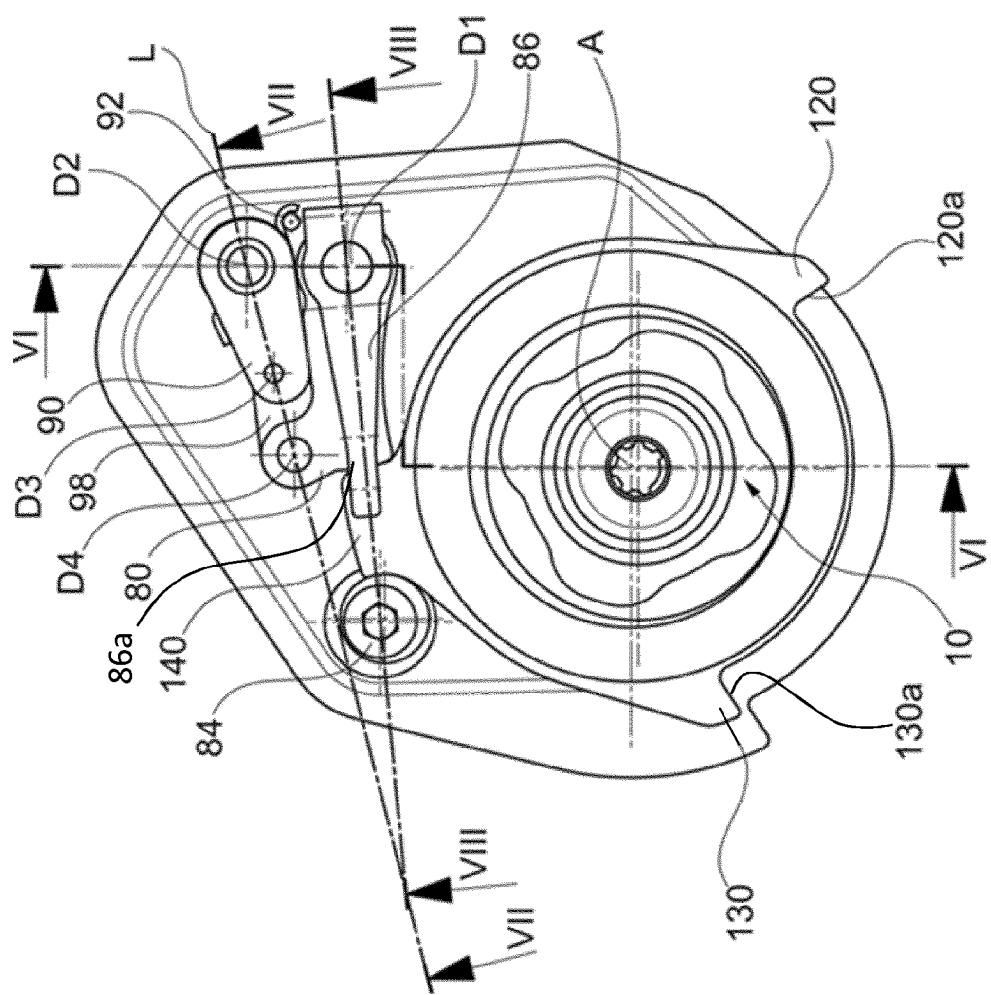
FIG. 5 is a top view onto the fitting.

A retaining spring 86, which is shown in FIG. 5 and is fastened on the bearing bolt 82, abuts against the projection 140 by way of a spring arm 86a with prestressing in the axial direction. If the third fitting part 74 is pivoted clearly forward, the spring arm 86a leaves the projection 140 and is resilient in the direction of the pawl 80 which, as a result, is prevented from locking behind the support face 140a.

Figure 4:
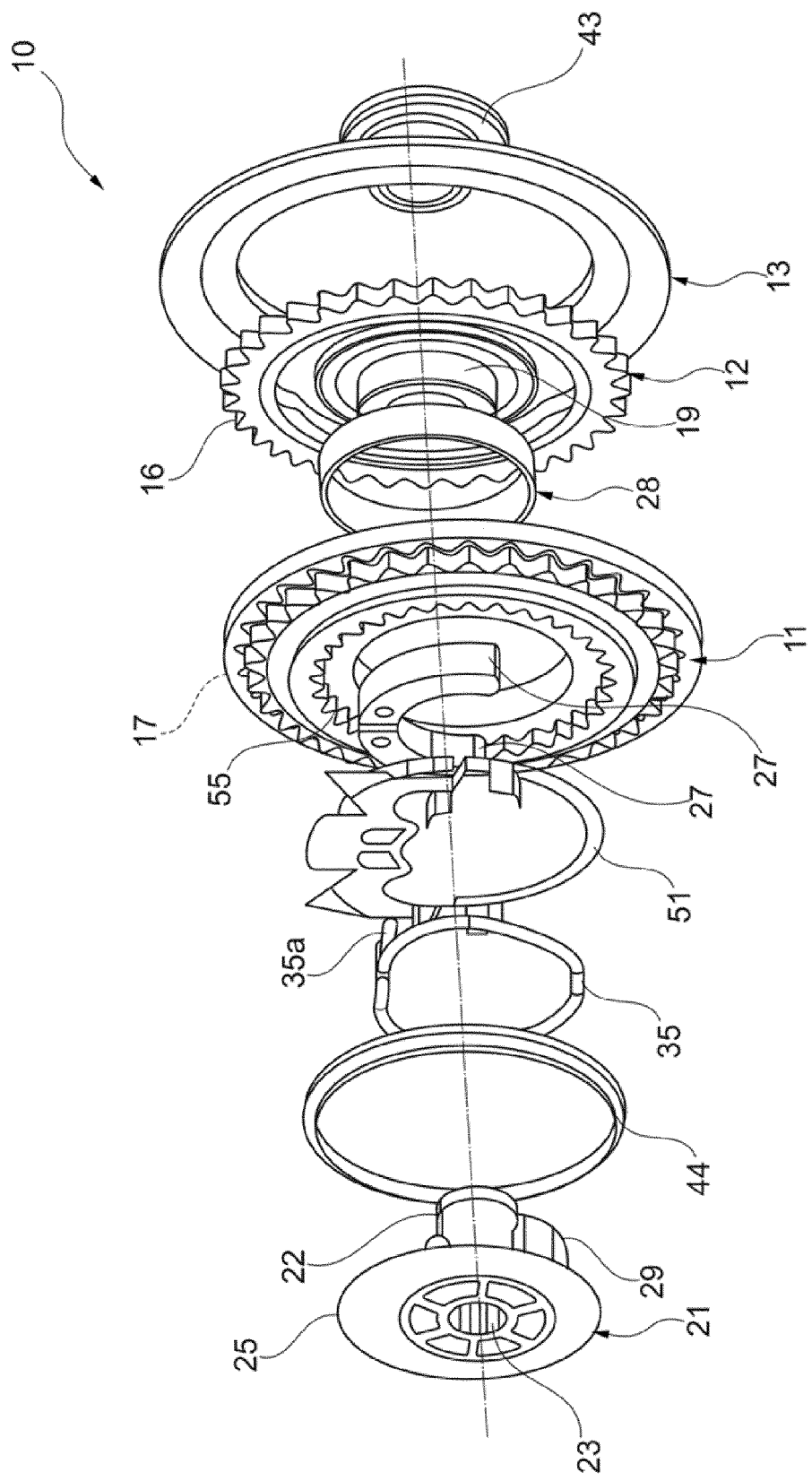
FIG. 4 is an exploded representation of the disk-shaped unit of the fitting with a first fitting part shown in a simplified manner.
Figure 6:
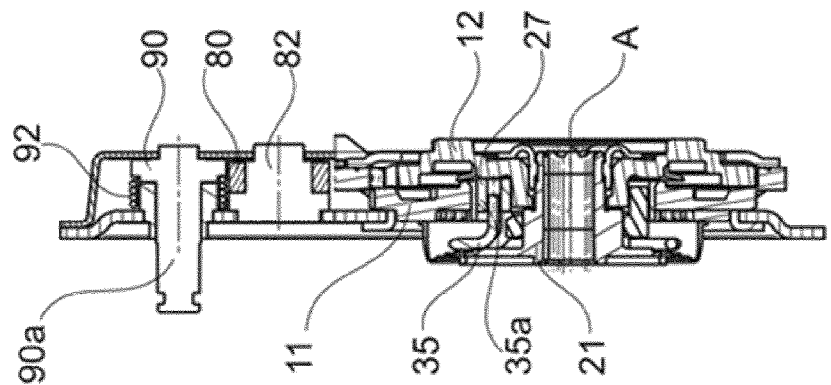
FIG. 6 is a section through the fitting along the line VI-VI in FIG. 5.

According to the invention, the projection 140 is integrally formed on the first fitting part 11, i.e. it forms a single-part component of the same as a material unit and is not a separately produced, subsequently fastened component. The first cam 120 and the second cam 130 are preferably also integrally formed on the first fitting part 11 (or on the encircling ring 13 or on the bearing ring 71). The solution according to the invention is favored by an encircling ring 13 having a substantially flat form, as shown in FIGS. 4 and 6, which in all cases engages over the first fitting part 11 in places and thus also enables radially protruding material parts on the edge of the first fitting part 11.

Different designs are possible for the projection 140 and the pawl 80. In a modified design, the pawl 80 can comprise several teeth which interact with several tooth spaces in the projection 140.

The features disclosed in the preceding description, the claims and the drawings can be important both individually and in combination to the realization of the invention in its different developments.

While specific embodiments of the invention have been shown and described in detail to illustrate the application of the principles of the invention, it will be understood that the invention may be embodied otherwise without departing from such principles.

The invention claimed is:

1. A fitting for a passenger vehicle seat, the fitting comprising:
   a first fitting part;
   a second fitting part the first fitting part and the second fitting part being rotatable relative to one another and are in geared connection with one another;
   a third fitting part mounted on the first fitting part so as to be pivotable relative to the first fitting part;
   a pawl mounted in a first hinge point on the third fitting part, wherein the third fitting part is lockable to the first fitting part by the pawl;
   a locking cam mounted in a second hinge point on the third fitting part;
   a coupler pivotably connected to the locking cam in a third hinge point and to the pawl in a fourth hinge point, wherein:
   the third fitting part, the locking cam, the coupler and the pawl define a four-bar linkage; and
   a spring prestresses the four-bar linkage in a direction of a locked position of the pawl, wherein the spring pivots the locking cam in abutment against the pawl.

2. A fitting as claimed in claim 1, wherein at least one of the first hinge point, the second hinge point, the third hinge point and the fourth hinge point of the four-bar linkage comprises a turning and sliding joint and remaining hinge points of the of the first hinge point, the second hinge point, the third hinge point and the fourth hinge point comprise turning joints.

3. A fitting as claimed in claim 2, wherein the second hinge point is the turning and sliding joint.

4. A fitting as claimed in claim 1, wherein the spring prestresses the locking cam in a direction of the locked position of the pawl.

5. A fitting as claimed in claim 1, wherein the locking cam is pivoted against the force of the spring for unlocking the pawl while the four-bar linkage is moved in a direction of an unlocked position of the pawl.

6. A fitting as claimed claim 1, wherein;
   an imaginary connecting line is between the second hinge point and the fourth hinge point; and
   in a locked state of the pawl, the third hinge point lies on the imaginary connecting line.

7. A fitting as claimed in claim 6, wherein during an unlocking operation of the pawl the third hinge point of the four-bar linkage is moved to a side of the connecting line remote from the pawl.

8. A fitting as claimed in claim 1, wherein:
   an imaginary connecting line is between the second hinge point and the fourth hinge point; and
   in the locked state of the pawl, the third hinge point lies between the imaginary connecting line and the pawl.

9. A fitting as claimed in claim 8, wherein during an unlocking operation of the pawl the third hinge point of the four-bar linkage is moved to a side of the connecting line remote from the pawl.

10. A fitting as claimed claim 1, wherein the locking cam includes a bearing journal which is rotatably mounted in an opening of the third fitting part thereby forming the second hinge point.

11. A fitting as claimed in claim 10, wherein the bearing journal comprises an interface for connection to a hand lever.

12. A fitting as claimed in claim 11, wherein the interface of the bearing journal comprises a polygonal form.

13. A fitting as claimed claim 1, wherein:
    the first fitting part has a projection; and
    the pawl comprises only one tooth in the form of a locking cam for interacting with the projection of the first fitting part.

14. A passenger vehicle seat comprising:
    a seat part;
    a back rest; and
    a fitting, the fitting comprising:
    a first fitting part;
    a second fitting part the first fitting part and the second fitting part being rotatable relative to one another and are in geared connection with one another;
    a third fitting part mounted on the first fitting part so as to be pivotable relative to the first fitting part;
    a pawl mounted in a first hinge point on the third fitting part, wherein the third fitting part is lockable to the first fitting part by the pawl;
    a locking cam mounted in a second hinge point on the third fitting part;
    a coupler pivotably connected to the locking cam in a third hinge point and to the pawl in a fourth hinge point, wherein:

the third fitting part, the locking cam, the coupler and the pawl define a four-bar linkage;

the seat part is connected to the second fitting part; and the back rest is connected to the third fitting part; and a spring biasing the four-bar linkage in a direction of a locked position of the pawl, wherein the spring pivots the locking cam in abutment against the pawl.

15. A passenger vehicle seat as claimed in claim 14, wherein at least one of the first hinge point, the second hinge point, the third hinge point and the fourth hinge point of the four-bar linkage comprises a turning and sliding joint and remaining hinge points of the of the first hinge point, the second hinge point, the third hinge point and the fourth hinge point comprise turning joints.

16. A passenger vehicle seat as claimed in claim 15, wherein the second hinge point is the turning and sliding joint.

\* \* \* \* \*